United States Patent [19]

Steely

[11] Patent Number: 4,887,263

[45] Date of Patent: Dec. 12, 1989

[54] VEHICLE MULTIPLEX SYSTEM WITH MULTIFUNCTION SWITCHES

[75] Inventor: Lee W. Steely, Reinholds, Pa.

[73] Assignee: AMP Incorporated, Harrisburg, Pa.

[21] Appl. No.: 130,349

[22] Filed: Dec. 8, 1987

[51] Int. Cl.$^4$ .............................................. H04J 3/00
[52] U.S. Cl. .................................... 370/85.1; 307/10.1
[58] Field of Search ................. 370/85, 77; 307/10 R; 340/22, 53, 52 R, 52 D

[56] References Cited

U.S. PATENT DOCUMENTS

| | | | |
|---|---|---|---|
| 3,864,578 | 2/1975 | Lackey | 307/10 R |
| 4,176,250 | 11/1979 | Berglind | 370/9 |
| 4,276,640 | 6/1981 | McNamee et al. | 370/77 |
| 4,293,947 | 10/1981 | Brittain | 370/89 |
| 4,370,561 | 1/1983 | Briggs | 370/85 |
| 4,435,648 | 3/1984 | Good, III | 340/53 |
| 4,682,168 | 7/1987 | Chang et al. | 340/825.65 |
| 4,683,975 | 8/1987 | Booth et al. | 318/282 |

Primary Examiner—Douglas W. Olms
Assistant Examiner—Min Jung

[57] ABSTRACT

An automotive vehicle having a control switch and at least two controlled elements includes a multiplex system having a central controller, at least one control bus coupled to the controller, and remote stations which apply a multiplexed data signal to the control bus indicative of the state of the switch and which demultiplex and store control signals from the controller for controlling activation of the first and second elements. The controller is programmed to set the control signals in accordance with the switch signal and in accordance with a status signal indicative of the state of the vehicle. The status signal can indicate whether any of the doors has been opened. By using a single control switch to perform multiple functions, depending upon the state of the vehicle, the total number of switches and therefore the cost of the system is reduced.

13 Claims, 12 Drawing Sheets

DATA INPUT SIGNALS

| DRIVER'S LEFT FRONT WINDOW | | DRIVER'S LEFT REAR WINDOW | | DRIVER'S RIGHT FRONT WINDOW | | DRIVER'S RIGHT FRONT WINDOW | |
|---|---|---|---|---|---|---|---|
| UP | DOWN | UP | DOWN | UP | DOWN | UP | DOWN |
| WS1 | WS2 | WS3 | WS4 | WS5 | WS6 | WS7 | WS8 |

<------------- ANY ONE ON -------------

|   |   |   |   |   |   |   |   |
|---|---|---|---|---|---|---|---|
| X |   |   |   |   |   |   |   |
|   | X |   |   |   |   |   |   |
|   |   | X |   |   |   |   |   |
|   |   |   |   | X |   |   |   |
|   |   |   |   |   |   | X |   |
|   |   |   |   |   |   |   | X |

| DOOR STATUS SIGNAL DO | IGNITION SIGNAL IGN | FUNCTION |
|---|---|---|
| DOORS CLOSED | IGNITION ON | SET WINDOW MOTOR CONTROL SIGNAL IN ACCORDANCE WITH INDIVIDUAL WINDOW INPUT SIGNALS |
| DOORS CLOSED | IGNITION ON | SET ALL FOUR WINDOW MOTOR UP CONTROL SIGNALS |
| DOORS CLOSED | IGNITION ON | SET ALL FOUR WINDOW DOWN CONTROL SIGNALS |
| DOORS CLOSED | IGNITION ON | COMPLEMENT CHILD LOCKOUT FLAG |
| DOORS OPEN | IGNATION OFF | SET LOCK MOTOR CONTROL SIGNALS TO LOCK (WHEN CHILD LOCKOUT FLAG=1) |
| DOORS OPEN | IGNATION OFF | SET LOCK MOTOR CONTROL SIGNALS TO UNLOCK (WHEN CHILD LOCKOUT FLAG=1) |
| ‡ | ‡ | SET LOCK MOTOR CONTROL SIGNALS IN ACCORDANCE WITH INDIVIDUAL LOCK INPUT SIGNALS |

‡ = EITHER STATE

VEHICLE MULTIPLEX SYSTEM WITH MULTIFUNCTION SWITCHES

BACKGROUND OF THE INVENTION

This invention relates to a multiplex control system for vehicles, which allows individual switches to have multiple functions, depending upon the state of the vehicle.

For some time there has been an interest in applying multiplex systems to control the components of vehicles such as automobiles. Britain U.S. Pat. No. 4,293,947 is one example of such a multiplex system. In spite of this interest, currently available vehicle multiplex systems do not fully exploit the potential of such systems for providing improved control functions in vehicles.

It is an object of this invention to provide an improved vehicle multiplex system which minimizes the total number of input switches required to control the vehicle.

It is another object of this invention to provide such a system in which individual switches command differing functions, depending upon the state of the vehicle.

It is yet another object of this invention to provide such a system in which power window control switches control the power windows when the ignition is on and the doors are closed, and which automatically command power lock operation when the ignition is off and any one of the doors is opened.

SUMMARY OF THE INVENTION

The preferred embodiment is described in conjunction with an automotive vehicle of the type comprising at least one power door lock, at least one power window motor, at least one power lock switch signal, and at least one power window switch signal. This embodiment includes a multiplex system comprising a central controller, at least one control bus coupled to the controller, means for applying multiplexed lock and window data signals to the control bus indicative of the states of the power lock switch signal and the power window switch signal, respectively, and means for demultiplexing and storing multiplexed lock and window control signals from the controller via the control bus and for controlling activation of the power door lock and the power window motor in response thereto. A multiplex ignition signal is applied to the control bus, and this signal is in the on state when the ignition circuit is switched on and in the off state when the ignition circuit is switched off. In addition, at least one door status signal is applied to the control bus, and this door status signal is in a first state when a selected set of the doors of the vehicle are all closed, and is in a second state when any of the doors in the selected set is open. The controller includes means for setting the lock control signal in accordance with the lock data signal, means for setting the window control signal in accordance with the window data signal when the ignition is on and the doors are closed, and means for preventing the window data signal from altering the state of the window control signal when the ignition is off and any of the doors is open.

This invention is not limited to use with lock and window signals as described above, but can rather be applied generally to vehicle multiplex systems in which the action commanded by a multiplexed switch signal is made to vary, depending upon a status signal indicative of whether the operator has placed the vehicle in a first or second state.

This invention provides important advantages in that it reduces the required number of switches to encode a full set of commands. In the example discussed in detail below, the rear doors of the vehicle are not provided with power lock control switches, and the power window control switches of the rear doors are used to activate the power locks when the ignition is off and any one of the doors of the vehicle is open. In this way, the total number of switches and therefore the total cost of the system is reduced.

Typically, a vehicle multiplex system will include remote stations and a central controller as described above, and the improved control functions described above can therefore be provided merely by properly programming the controller. This can be accomplished with little or no increase in the manufacturing cost of the multiplex system. Thus, improved control functions are provided by replacing hardware and in particular additional switches with programmed logic included in the controller.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
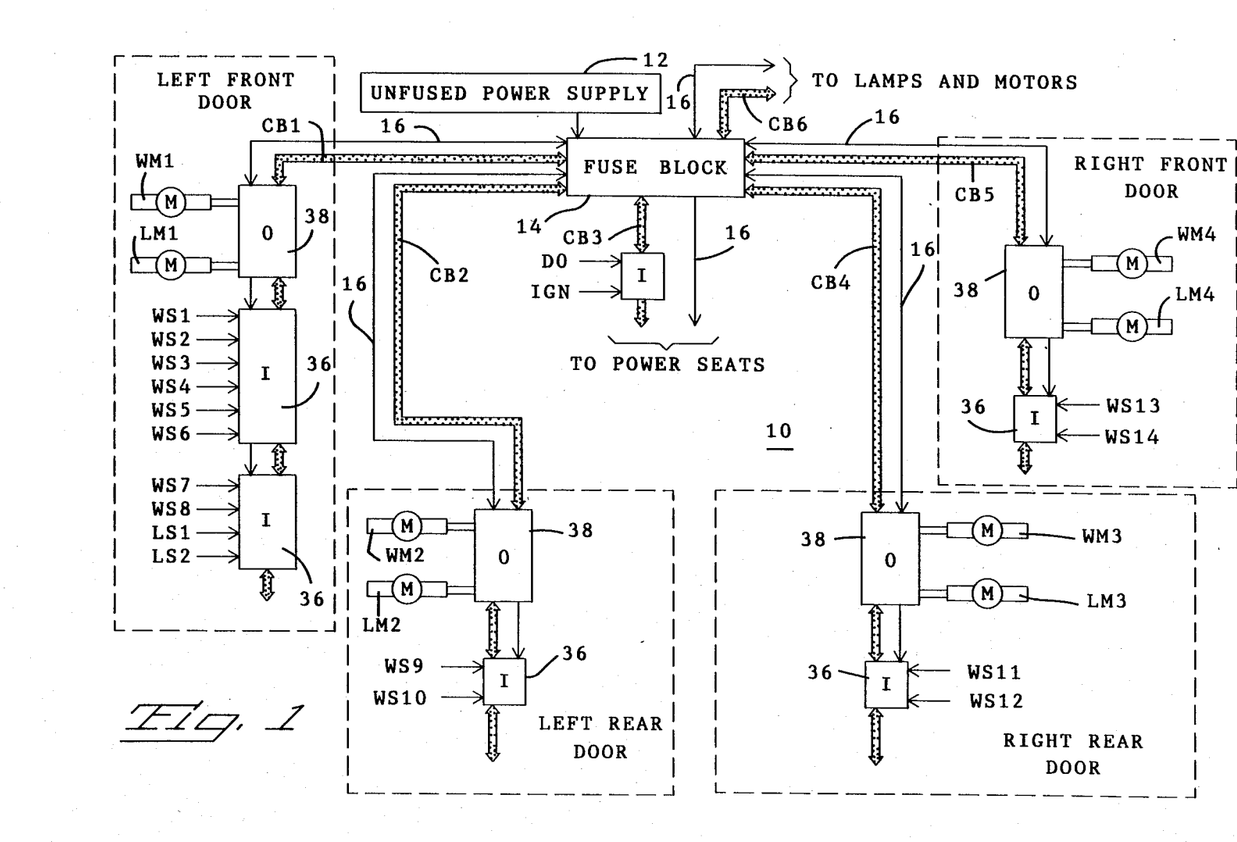
FIG. 1 is a block diagram of portions of a vehicle multiplex system which incorporates a presently preferred embodiment of this invention.

Turning now to the drawings, FIG. 1 is a block diagram of a vehicle multiplex system 10 which is adapted for use with a vehicle such as an automobile of the type which includes an unfused power source 12 and a fuse block 14. A number of DC power buses 16 radiate from the fuse block 14, along with a number of parallel control buses CB1–CB6. FIG. 1 is not intended to show the entire multiplex system of the vehicle, but only those portions important to understanding the operation of this embodiment.

As shown in FIG. 1, the control bus CB3 receives a data input signal D0 indicative of whether any of the four doors of the vehicle is open, and a data input signal IGN indicative of whether the ignition is switched to the run mode or not.

Control bus CB1 interconnects the fuse block 14 with the left front door, and is connected to two input units 36 and an output unit 38. As shown in FIG. 1 the output unit controls power to the left front window motor WM1 and lock motor LM1 that operate the left front power window and the left front power lock. The input units 36 receive 10 binary signals WS1-WS8, LS1, LS2 from respective switches (not shown) which allow the driver to command any of the four vehicle windows up or down and to command the power locks to be locked or unlocked.

Control bus CB2 interconnects the fuse block 14 with the left rear door, and is connected to one input unit 36 and one output unit 38. The input unit 36 receives two binary signals WS9, WS10 by which the occupant of the left rear seat can command the left rear window up or down. The output unit 38 controls power to the left rear power window motor WM2 and the left rear power lock motor LM2. The control bus CB4 interconnects the fuse block 14 with the right rear door and includes an input unit 36 and an output unit 38 similar to those described in connection with the left rear door.

The control bus CB5 interconnects the fuse block 14 with the right front door and is coupled to an input unit 36 and an output unit 38. The input unit 36 of the right front door receives two binary input signals WS13, WS14 by which the right front occupant of the vehicle can command the right front window up and down. The output unit 38 in the right front door control power to the right front window motor WM4 and the right front lock motor LM4.

Table 1 summarizes the functions of the motors WM1-WM4 and LM1-LM4, and Table 2 summarizes the functions of the data input signals WS1-WS14, LS1-LS2, D0 and IGN.

Figure 2:
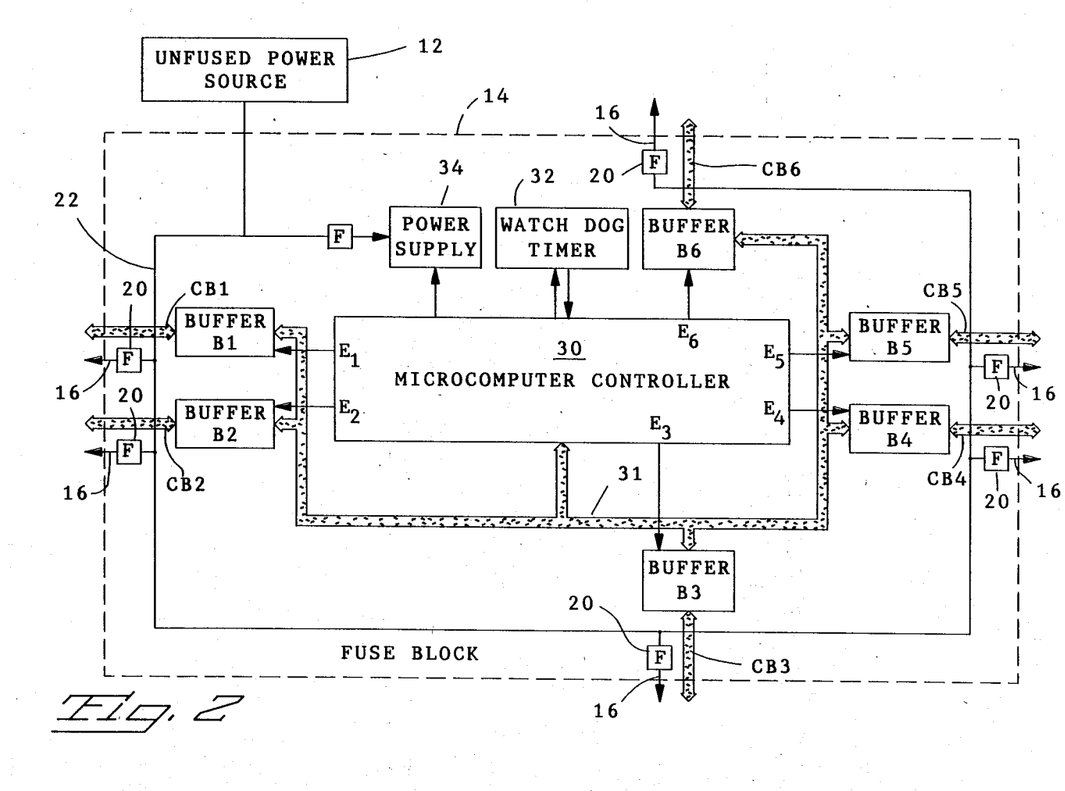
FIG. 2 is a block diagram of the fuse block of FIG. 1.

FIG. 2 shows a more detailed block diagram of the fuse block 14. Fuses 20 are interconnected between the unfused power source 12 and each of the power buses 16. In addition, the fuse block 14 includes a microcomputer controller 30, a watch dog timer 32, a power supply 34, and a number of buffers B1-B6. The controller 30 applies control signals to a control bus 31 and reads multiplexed signals from the control bus 31, and the buffers B1-B6 are controlled to ensure that the control bus 31 is interconnected with only one of the control buses CB1-CB6 at any given time. In this way, the total length of action control bus is minimized, thereby reducing electromagnetic interference and noise susceptibility. Reliability is also improved in that a short in any one of the control buses CB1-CB6 will not interfere with proper operation of the remaining control buses.

Figure 3:
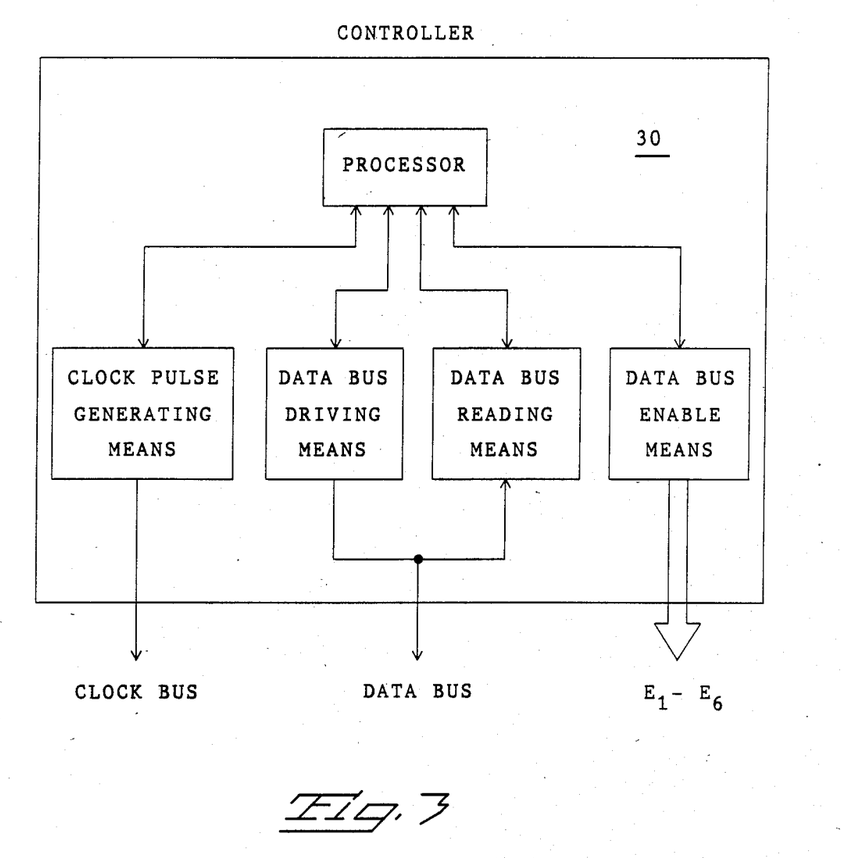
FIG. 3 is a block diagram of the controller of FIG. 2.

As shown in FIG. 3, the controller 30 includes a clock pulse generating means which generates sets of clock pulses on a clock bus, along with data bus driving means and data bus reading means for applying multiplexed signals to and reading multiplexed signals from a data bus, respectively. The clock and data buses are both included in the control bus 31. The controller 30 also includes buffer enable means which generates enable signals E1-E6 to control the buffers B1-B6, and each of these four means is controlled by a processor.

The processor controls the clock pulse generating means to generate clock pulses in sets separated by a period of no clock pulses. Each set of clock pulses comprises n subsets, where n is equal to the total number of separately addressed remote stations, as described below. Each subset includes eight clock pulses, and each clock pulse defines a respective data transmission time slot or channel on the data bus. Thus, each remote station is enabled for one subset of clock pulses and therefore eight time slots) within each set of clock pulses. The processor maintains a table of the state of all of the data channels, including both commands (sent from the controller 30 to the remote stations) and responses (sent from the remote stations to the controller 30). The data bus driving means of the controller 30 uses this table to drive the data bus high or low as appropriate to ensure that commands are sent by the controller 30 to the remote stations at appropriate times to transmit the command portion of the table. The data bus reading means of the controller 30 samples and stores the state of the data bus at appropriate times to ensure that responses from the remote stations are stored in appropriate locations on the table.

The multiplex system 10 includes input units 36 and output units 38 that are coupled to the control buses. The input units 36 convert standard signals into a time multiplexed format and apply them at appropriate times to the respective control buses. The output units 38 read the state of the data bus of the control bus at selected times, and latch the reading, which is then used for control purposes.

Figure 5:
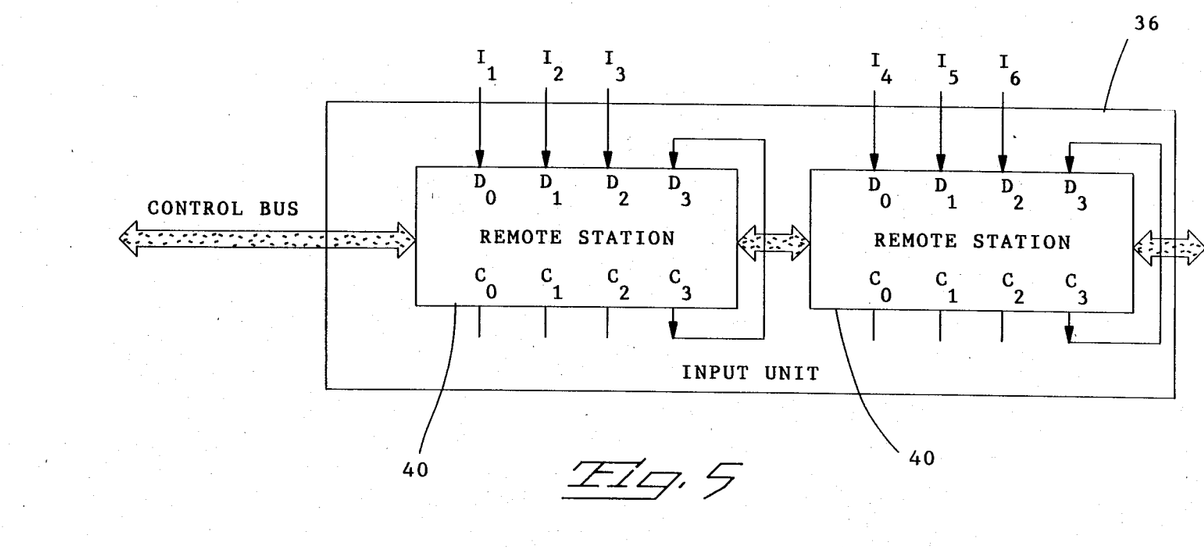
FIG. 5 is a block diagram of one of the input units of FIG. 1.

FIG. 5 shows a block diagram of one of the input units 36. As shown in FIG. 5, each input unit 36 includes two remote stations 40, each of which has inputs D0-D3 for four data signals to be multiplexed and applied to the control bus, and outputs C0-C3 for four command signals which are read from the control bus, demultiplexed, and applied as outputs on the respective terminals. As shown in FIG. 5, control output C3 is applied directly to data input D3 to check for proper operation of each remote station 40.

Figure 4:
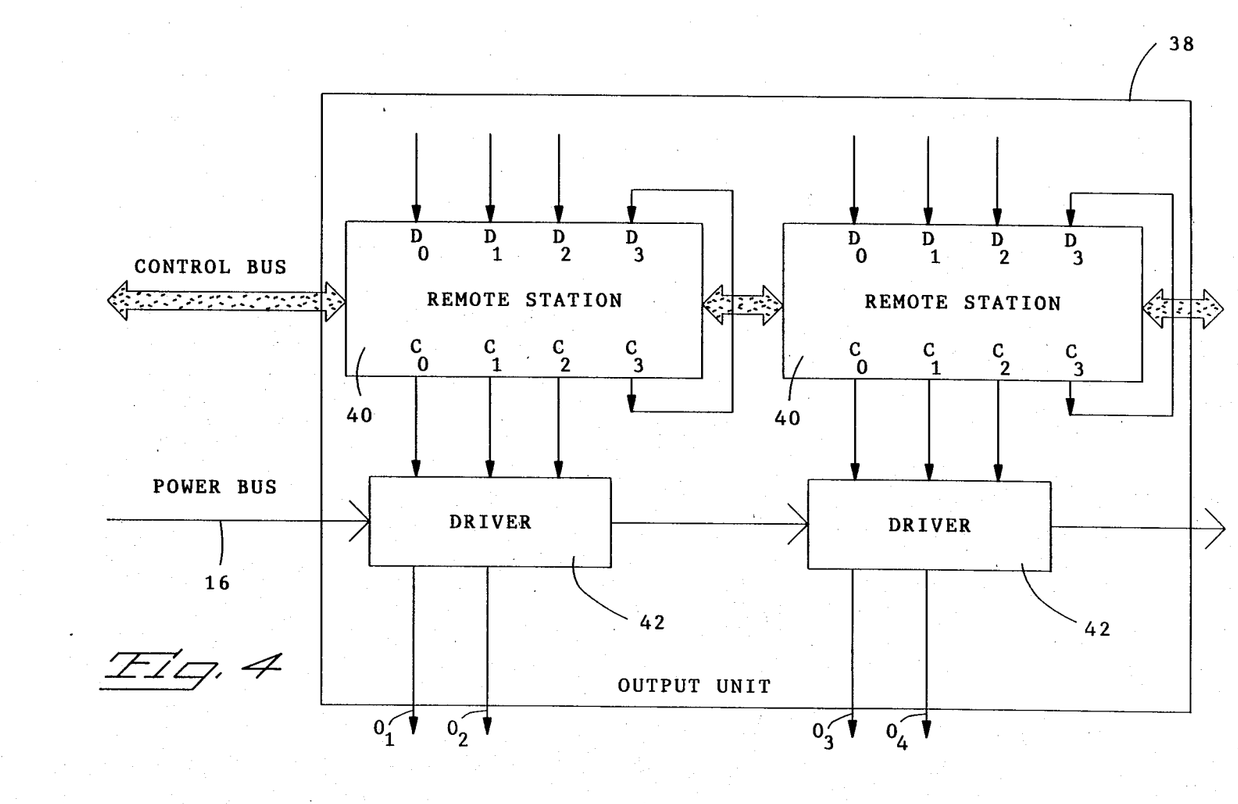
FIG. 4 is a block diagram of one of the output units of FIG. 1.

FIG. 4 shows a block diagram of one of the output units 38, which also includes two remote stations 40 of the type described above. Each output unit 38 also includes two drivers 42 which are interconnected with the power bus 16. Depending upon the state of the control signals C0-C2, the drivers 42 either apply 12 VDC or 0 VDC to power outputs 01-04.

Figure 6:
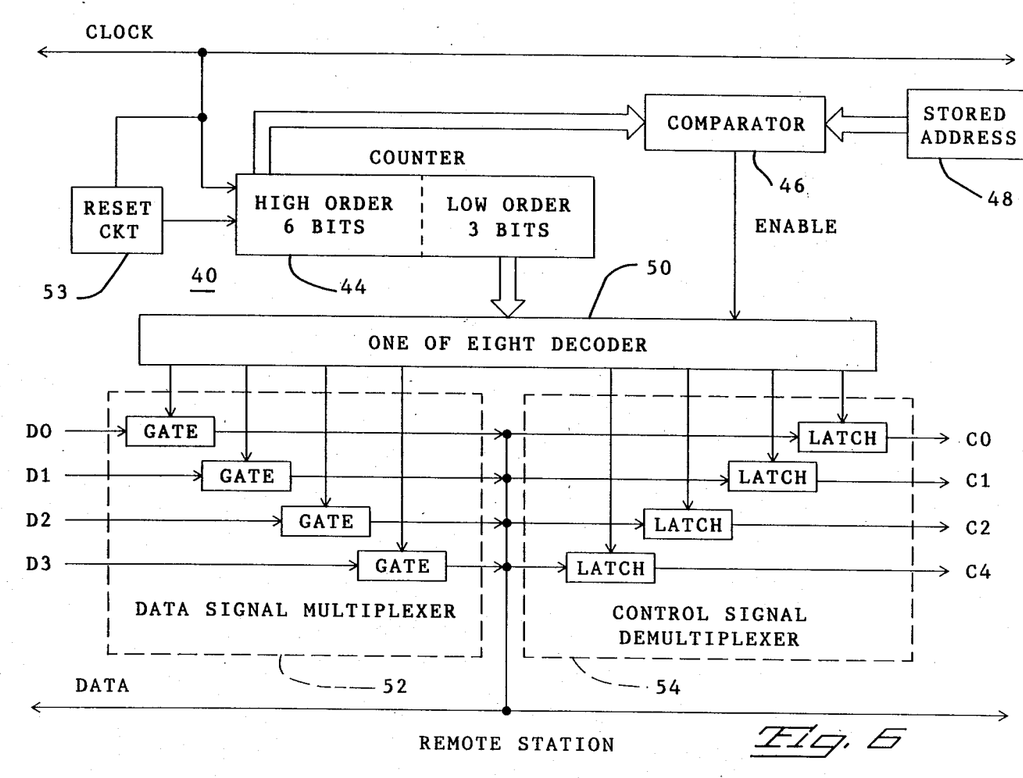
FIG. 6 is a block diagram of one of the remote stations of FIGS. 4 and 5.

FIG. 6 shows a block diagram of one of the remote stations 40, which interacts with both the clock bus and the data bus included in the control bus. Each remote station 40 includes an eight bit counter which has a higher order 6 bit section and a lower order 3 bit section. This counter is responsive to the clock pulses on the clock bus. The high order 6 bits of the counter 44 are compared in a comparator 46 with a stored 6 bit address stored in the means 48. When the high order 6 bits of the counter 44 are equal to the stored address in the means 48, the comparator 46 enables a decoder 50 that decodes the low order 3 bits of the counter 44. Typically, each of the remote stations 40 in the system will have a unique address. The remote station 40 includes a data signal multiplexer 52 which includes four gates, each operating to gate a respective one of the data signals D0–D3, as well as a control signal demultiplexer 54 which includes four latches, each arranged to latch and hold a respective one of the control signals C0–C3. Each of the gates and each of the latches is connected to the data bus included in the control bus.

For the eight clock pulse cycles during which the comparator 46 enables the decoder 50, the decoder 50 sequentially enables respective ones of the gates and latches. When any one of the gates is enabled, it applies the respective data signal D0–D3 to the data bus. Similarly, when any of the latches is enabled, it latches and holds the state of the data bus at the corresponding time, and applies the latched state as a command signal C0–C3.

In order to synchronize the counter 44 with the controller 30, the remote station 40 includes a reset circuit 53 which monitors the clock bus for an absence of clock pulses. Whenever the reset circuit 53 fails to detect a clock pulse for a selected time interval, the reset circuit resets the counter 44 to zero. The controller transmits the clock pulses in sets, and each set is separated by a period of no clock pulses longer than the selected time interval of the reset circuit 53. Thus, the reset circuit 53 resets the counter 44 between each set of clock pulses.

The present invention is not limited to the particular type of vehicle multiplex system described above; however, further features of this multiplex system can be found in U.S. patent application Ser. No. 107,623 (filed Oct. 9, 1987), which defines the presently preferred construction for the fuse block 14, buses CB1–CB6, input and output units 36, 38; 064,917 (filed June 19, 1987), which defines the presently preferred structure for the driver 42; and 837,911 (filed Mar. 10, 1986), which defines the presently preferred structure for the data bus driving and reading means of the controller; along with U.S. Pat. No. 4,682,168, which defines the presently preferred embodiment for the remote station 40. In addition, the discussion of the Type A Remote Stations in U.S. patent application Ser. No. 921,185, filed Oct. 21, 1986, provides additional information about the remote station 40. All of these patent documents are hereby incorporated by reference.

Figure 7:
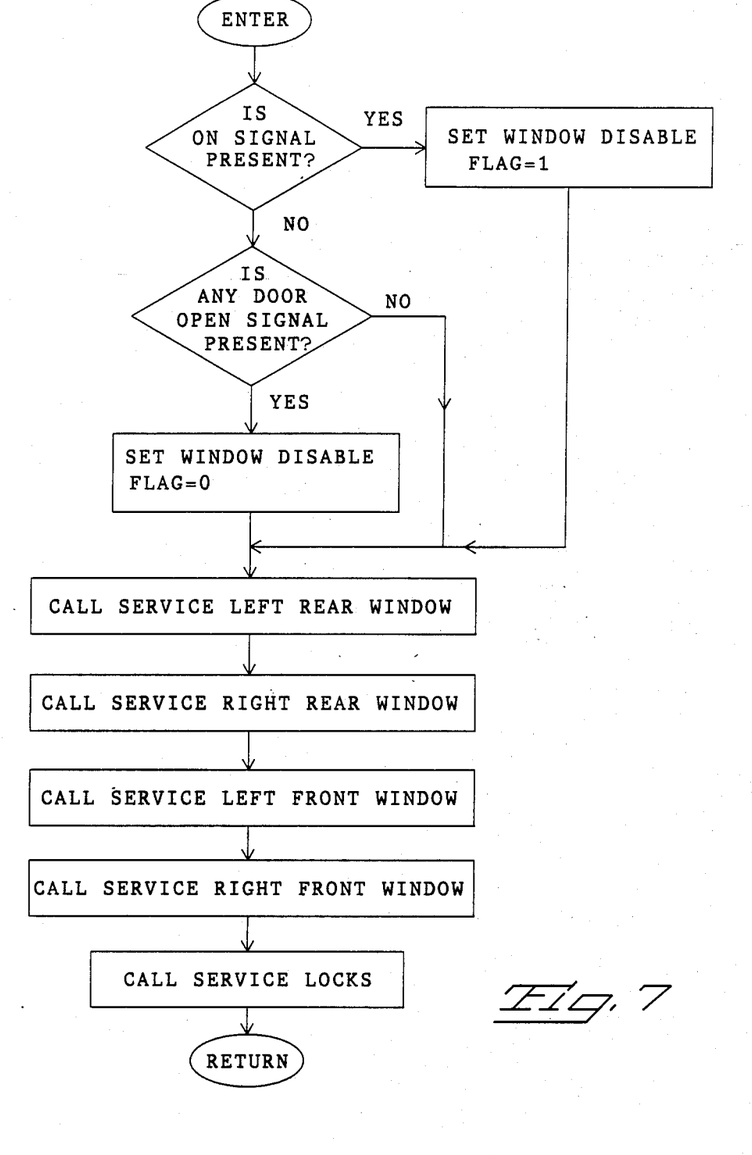
FIG. 7 is a flow chart of a routine executed by the controller 30 to control power windows and power locks.
Figure 8A:
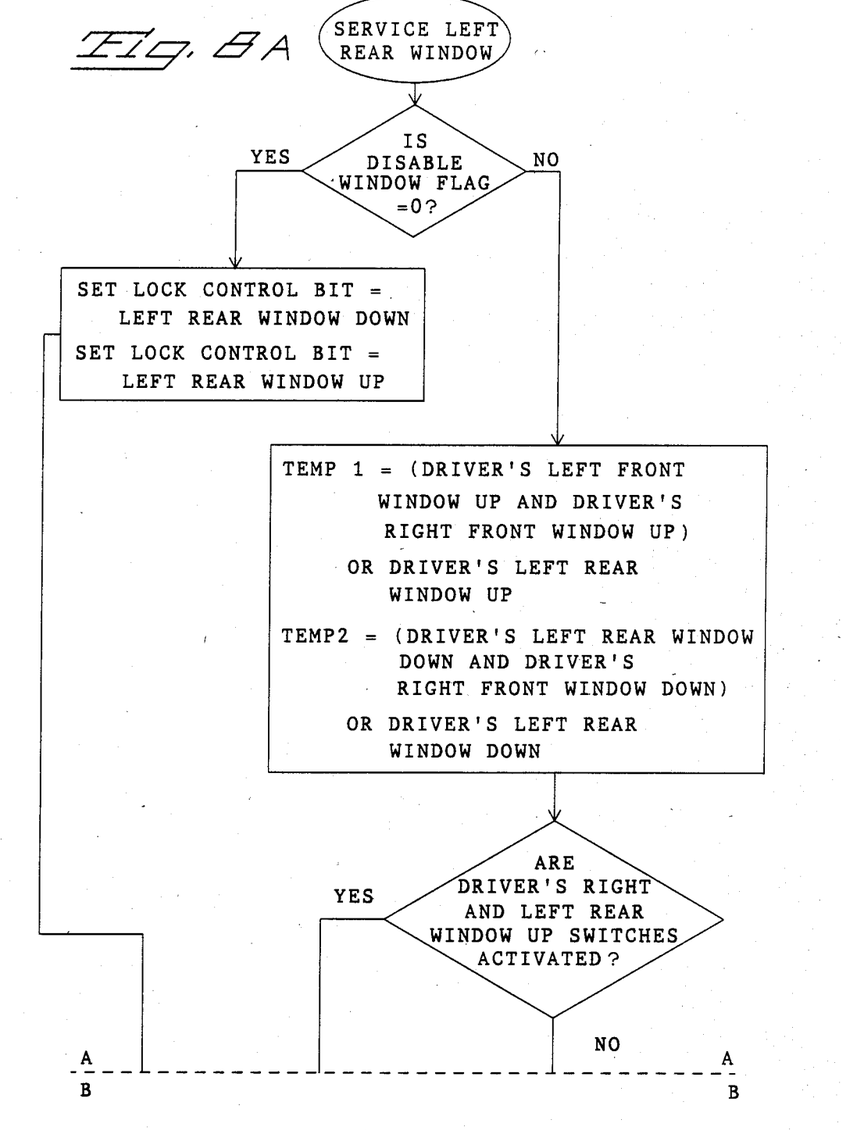
FIGS. 8A and 8B are a flow chart of the Service Left Rear Window routine of FIG. 7.
Figure 8B:
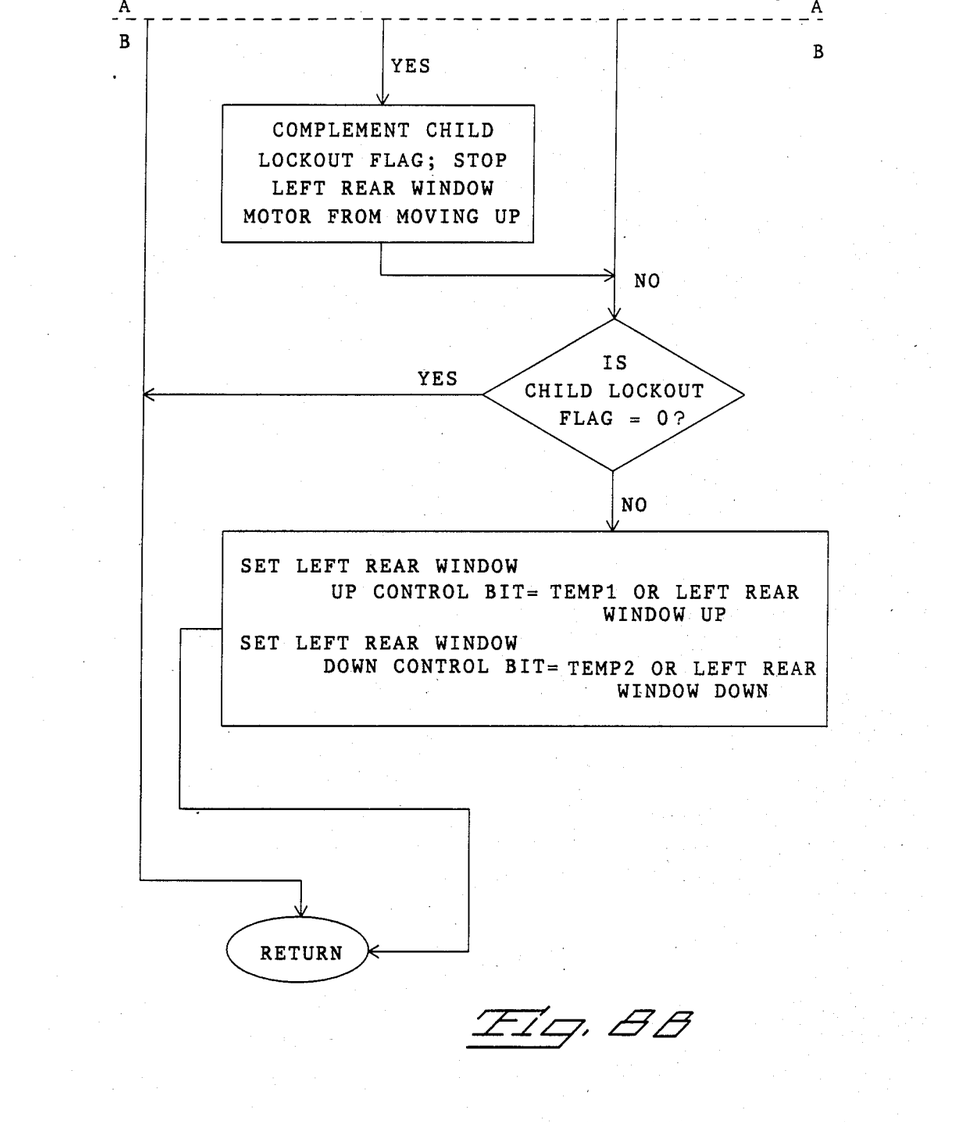
Figure 9A:
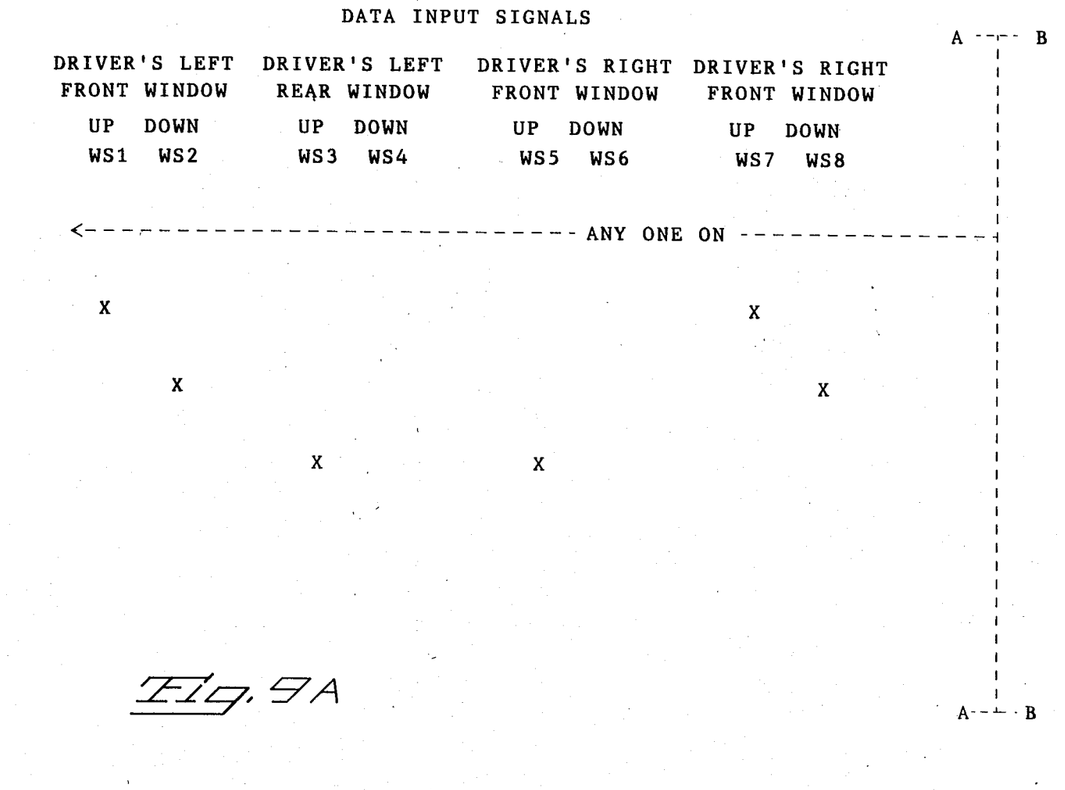
FIGS. 9a through 9c are a table defining certain functions performed by the controller 30.
Figure 9B:
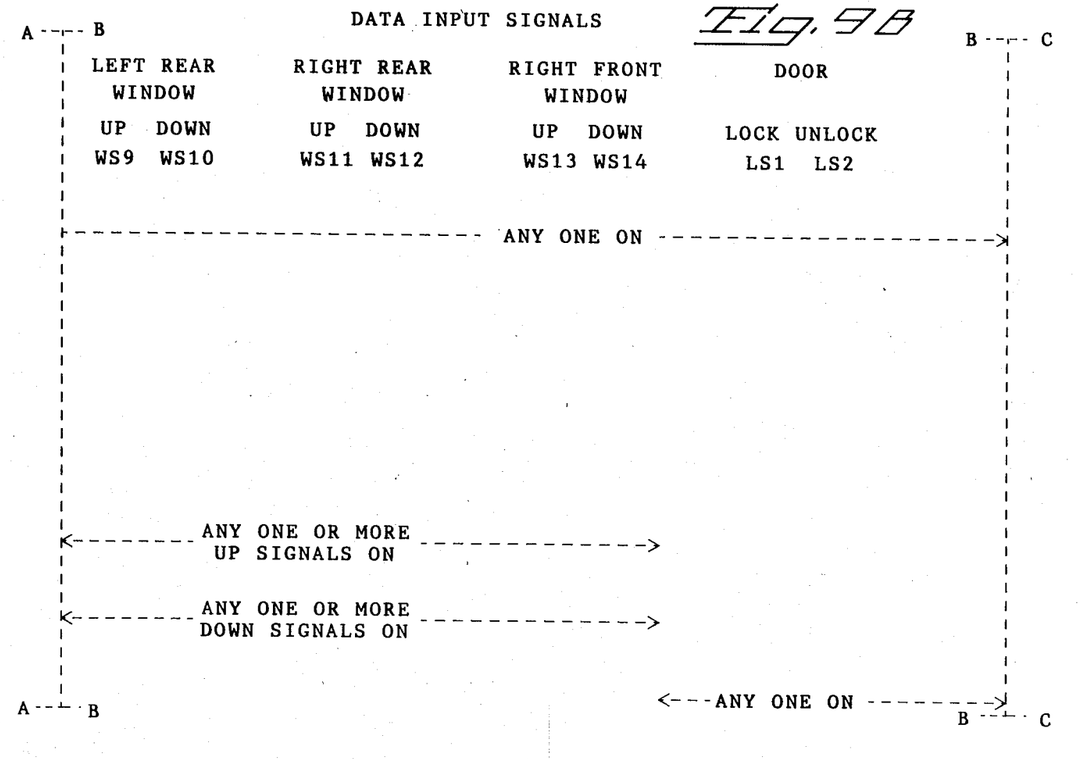
Figure 9C:
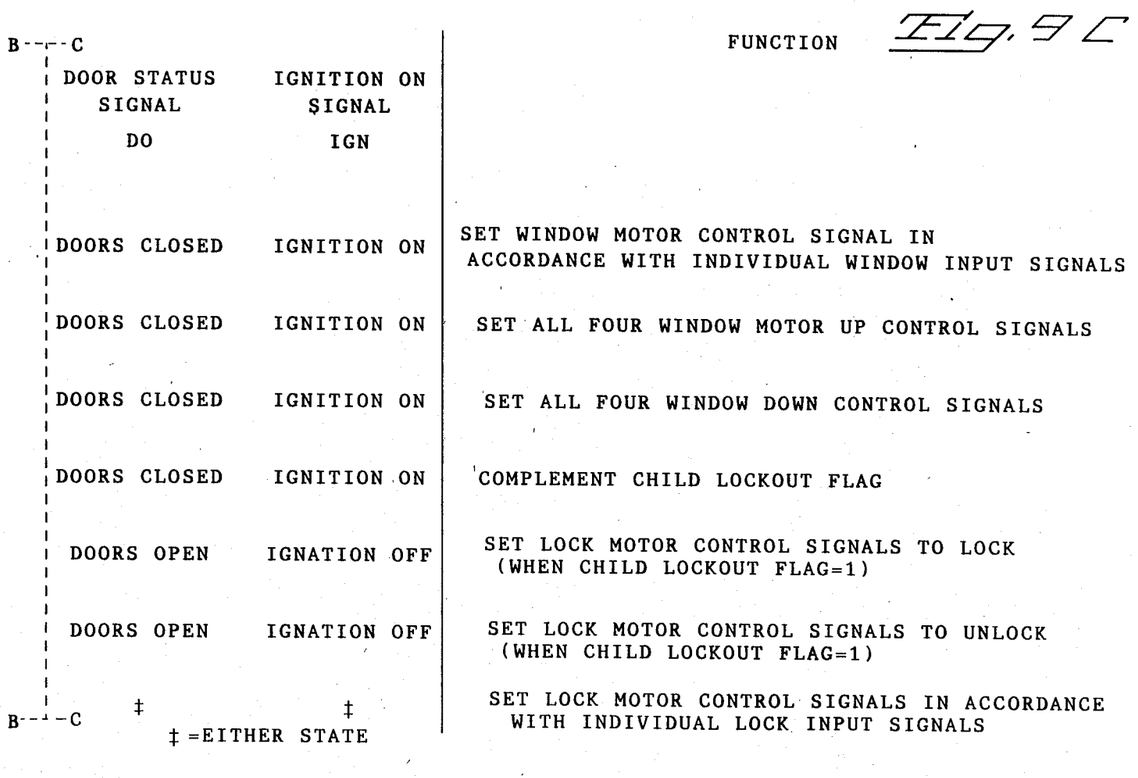

According to this invention, the controller 30 does not always respond to the data input signals in the same manner. Rather, the response of the controller 30 to several of the data input signals depends upon the state of the vehicle. FIGS. 7–9 provide flow charts for routines executed by the processor included in the controller 30 which illustrate this feature of the preferred embodiment.

FIG. 7 shows a general flow chart of the routine that controls the power windows and power locks. As shown in FIG. 7, this routine first checks the state of the ignition on signal IGN. This signal indicates whether the vehicle ignition has been switched to the run mode or not. If the ignition is switched on, the Window Disable Flag is set equal to 1. Otherwise, the routine checks the state of the any door open signal D0. If any of the four doors of the vehicle is open, the routine sets the Window Disable Flag equal to 0. Then routines are called to service the four power windows and the power locks. Each of these routines sets control bits to activate or deactivate appropriate ones of the window and lock motors.

FIG. 8 shows a flow chart of the Service Left Rear Window routine. This routine begins by checking the Disable Window Flag. If the Disable Window Flag is equal to 0 then the lock and unlock control bits are set in accordance with the left rear window down and up data signals WS10, WS9, respectively. When the Disable Window Flag is equal to 0 the left and right rear window switches operate the power lock motors LM1–LM4 rather than the associated power window motors WM2, WM3.

Assuming the Disable Window Flag is not equal to 0, then TEMP1 is set to (driver's left front window up signal WS1 AND driver's right front window up signal WS7) OR driver's left rear window up signal WS3; TEMP2 is set equal to (driver's left front window down signal WS2 and driver's right front window down signal WS8) OR driver's left rear window down signal WS4. Then the routine checks to determine whether both the driver's right and left rear window up signals WS3, WS5 are present. If so, the Child Lockout Flag is complemented and the left rear window up control bit is set to stop any up movement of the left rear window motor WM2 by the driver's left rear window switch. If the Child Lockout Flag is equal to zero, the left rear window up and down switches are not sampled and the control bits are left unchanged. Otherwise, the left rear window up and down control bits are set equal to TEMP1 OR the left rear window up signal WS9 and to TEMP2 OR the left rear window down signal WS10, respectively. The routine then returns. It should also be noted, that in order to run the routine, it may be required that the Child Lockout Flag be in the off state. This provides the safety feature of being unable to lock all the doors from the rear when children are in the car.

In summary, the routine of FIG. 8 ensures that the left rear window up and down signals control the power locks rather than the power windows when the Disable Window Flag is equal to 0. Otherwise, the left rear window up control bit is set (to cause the left rear window to be raised) if the Child Lockout Flag is not equal to zero and either (1) the left rear window up switch has been depressed, or (2) the driver's left rear window up switch has been depressed, or (3) both the driver's left and right front window up switches have been depressed. Similar logic is used to control the left rear window down control bit in the flow chart of FIG. 8.

FIGS. 9a through 9c summarize the manner in which the controller 30 responds to the window and power lock data input signals WS1–WS14, LS1, LS2 for various states of the ignition on signal 1GN and the door status signal D0. In the event the doors are closed and the ignition is on, the controller 30 sets the control signals for the window motors WM1–WM4 in accordance with individual window data input signals when any one of the window data input signals WS1–WS14 is on. In addition, when the vehicle is in the state described above and both the driver's right and left front window switches are placed in the up position, all four window motor up control signals are set. Similarly, when both of the driver's right and left front window down switches are activated all four window motor down control signals are set.

As shown in FIGS. 9a through 9c, when the both the driver's left and right rear window up switches are activated the Child Lockout Flag is complemented.

When any of the doors is open after the ignition is off either of the rear window up signals causes the lock motor control signal to be set to unlock the power locks, and either of the rear down window signals causes the lock motor control signals to be set to lock the power locks. Under these conditions, all window operations are not permitted. At any time the lock and unlock switches can be used to control the lock motor control signals.

Table 3 provides an object code listing of programs that perform the functions flow charted in FIG. 8. This listing is intended for execution on an Intel 8051 microprocessor, and utilizes the following addresses:

front window switch will cause either all windows to be raised (in the event the driver's left front up window switch is simultaneously activated) or to cause only the driver's right front window to be raised (in the event the driver's left front up window switch is not simultaneously activated). In this way, the total number of switches required to command a desired set of functions is reduced, and along with it the hardware complexity of the system.

These advantages are obtained without increasing the manufacturing cost and without decreasing the reliability of the multiplex system. This is because the multifunction switch features described above are obtained by properly programming the controller 30, without requiring any additional hardware beyond the very limited memory requirements needed to store the associated programs.

Of course, it should be understood that a wide range of changes and modifications can be made to the preferred embodiment described above. For example, the multifunction switch features of this invention can be used in vehicles employing multiplex systems which differ from that described above. Though the details of operation of the multiplex system described above have been found to provide important advantages, other types of multiplex systems may be preferable in other applications. For example, multiplex systems with fiber optic buses have particular advantages in applications where light weight or low susceptibility to EMI is important. Furthermore, the multifunction features of this

| DISABLE WINDOW FLAG | = 55H (Bit) |
|---|---|
| | = 2AH.5 |
| DRIVER'S LEFT FRONT UP WINDOW BIT | = 31H.7 |
| DRIVER'S LEFT FRONT DOWN WINDOW BIT | = 31H.2 |
| DRIVER'S LEFT REAR UP WINDOW BIT | = 31H.5 |
| DRIVER'S LEFT REAR DOWN WINDOW BIT | = 31H.6 |
| DRIVER'S RIGHT REAR UP WINDOW BIT | = 30H.7 |
| DRIVER'S RIGHT REAR DOWN WINDOW BIT | = 30H.2 |
| DRIVER'S RIGHT FRONT UP WINDOW BIT | = 30H.1 |
| DRIVER'S RIGHT FRONT DOWN WINDOW BIT | = 30H.0 |
| LEFT REAR UP WINDOW BIT | = 33H.2 |
| LEFT REAR DOWN WINDOW BIT | = 33H.1 |
| RIGHT REAR UP WINDOW BIT | = 37H.5 |
| RIGHT REAR DOWN WINDOW BIT | = 37H.6 |
| RIGHT FRONT UP WINDOW BIT | = 37H.0 |
| RIGHT FRONT DOWN WINDOW BIT | = 38H.5 |
| IGNITION ON BIT | = B2H (PORT P3.2) |
| ANY DOOR OPEN BIT | = B3H (PORT P3.3) |
| LOCK CONTROL BIT | = 30H.6 |
| UNLOCK CONTROL BIT | = 30H.5 |
| LEFT FRONT UP WINDOW CONTROL BIT | = 22H.7 |
| LEFT FRONT DOWN WINDOW CONTROL BIT | = 22H.6 |
| LEFT REAR UP WINDOW CONTROL BIT | = 23H.7 |
| LEFT REAR DOWN WINDOW CONTROL BIT | = 23H.6 |
| RIGHT REAR UP WINDOW CONTROL BIT | = 27H.7 |
| RIGHT REAR DOWN WINDOW CONTROL BIT | = 27H.6 |
| RIGHT FRONT UP WINDOW CONTROL BIT | = 29H.7 |
| RIGHT FRONT DOWN WINDOW CONTROL BIT | = 29H.6 |

From this description it should be apparent that the action taken by the controller depends not only upon the switches activated by the occupants of the vehicle, but also upon the state of the vehicle as determined by the occupants. By opening a door or switching off the ignition, the occupants of the vehicle can cause the rear window control switches to take on lock control functions. Similarly, the driver can change the state of the vehicle so as to determine whether the driver's right invention can be applied to other vehicle switches than those described above, as for example the switches associated with power seat operation.

It is therefore intended that the foregoing detailed description be regarded as illustrative rather than limiting, and that it be understood that it is the following claims, including all equivalents, which are intended to define the scope of this invention.

TABLE 1

| MOTOR | FUNCTION |
|---|---|
| WM1 | LEFT FRONT WINDOW (UP/DOWN) |
| WM2 | LEFT REAR WINDOW (UP/DOWN) |
| WM3 | RIGHT REAR WINDOW (UP/DOWN) |
| WM4 | RIGHT FRONT WINDOW (UP/DOWN) |
| LM1 | LEFT FRONT LOCK (LOCKED/UNLOCKED) |
| LM2 | LEFT REAR LOCK (LOCKED/UNLOCKED) |
| LM3 | RIGHT REAR LOCK (LOCKED/UNLOCKED) |
| LM4 | RIGHT FRONT LOCK (LOCKED/UNLOCKED) |

TABLE 2

| DATA INPUT SIGNAL | FUNCTION |
|---|---|
| WS1 | DRIVER'S LEFT FRONT WINDOW UP |
| WS2 | DRIVER'S LEFT FRONT WINDOW DOWN |
| WS3 | DRIVER'S LEFT REAR WINDOW UP |
| WS4 | DRIVER'S LEFT REAR WINDOW DOWN |
| WS5 | DRIVER'S RIGHT REAR WINDOW UP |
| WS6 | DRIVER'S RIGHT REAR WINDOW DOWN |
| WS7 | DRIVER'S RIGHT FRONT WINDOW UP |
| WS8 | DRIVER'S RIGHT FRONT WINDOW DOWN |
| WS9 | LEFT REAR WINDOW UP |
| WS10 | LEFT REAR WINDOW DOWN |
| WS11 | RIGHT REAR WINDOW UP |
| WS12 | RIGHT REAR WINDOW DOWN |
| WS13 | RIGHT FRONT WINDOW UP |
| WS14 | RIGHT FRONT WINDOW DOWN |
| LS1 | DOOR LOCK |
| LS2 | DOOR UNLOCK |
| DO | ANY DOOR OPEN (YES/NO) |
| IGN | IGNITION IN RUN MODE (YES/NO) |

TABLE 3

SERVICE LEFT REAR WINDOW

| MEMORY ADDRESS | | | | | | | | | | | | | | | |
|---|---|---|---|---|---|---|---|---|---|---|---|---|---|---|---|
| 000A0E: | D2 | D4 | D2 | D3 | 85 | 79 | F0 | 75 | 45 | FF | 74 | FF | D3 | 20 | 5C | 0B |
| 000A1E: | 30 | 55 | 2A | E5 | 30 | A2 | E7 | 44 | FC | F5 | 45 | E5 | 31 | 72 | E5 | 40 |
| 000A2E: | 02 | D2 | E5 | 44 | 1B | 55 | 45 | A2 | E2 | 72 | E0 | 82 | E6 | 92 | E3 | A2 |
| 000A3E: | E7 | 72 | E1 | 82 | E5 | 92 | E4 | 44 | E7 | 03 | 03 | F5 | 45 | 30 | 5D | 0E |
| 000A43: | E5 | 33 | 44 | F9 | A2 | E1 | 82 | E2 | 92 | F7 | 52 | 45 | E5 | 45 | F4 | 70 |
| 000A53: | 20 | DE | 14 | 7E | 01 | D2 | F0 | D2 | F1 | 30 | F2 | 4F | 43 | 23 | F0 | D2 |
| 000A6E: | F3 | D2 | F4 | 85 | F0 | 79 | 22 | 30 | F2 | 41 | BE | 0C | 00 | 50 | 3C | 80 |
| 000A7E: | EB | 0E | BE | 18 | 00 | 40 | F0 | F4 | A2 | E1 | 92 | F4 | A2 | E2 | 92 | F3 |
| 000A8E: | 20 | 5C | 0C | 30 | F2 | 00 | 30 | F1 | 06 | 30 | 55 | 03 | 30 | F4 | 09 | 1E |
| 00049E: | 02 | 0A | B1 | 20 | F1 | 22 | 80 | F7 | BE | 96 | 00 | 40 | 06 | AE | 17 | C2 |
| 000AAE: | F2 | C2 | F1 | 30 | F0 | 05 | 75 | 7C | 50 | C2 | F0 | 74 | 50 | C2 | AF | B5 |
| 000ABE: | 7C | 00 | D2 | AF | 50 | 07 | D2 | F2 | 75 | 7C | FF | 80 | 9F | 20 | 5C | 03 |
| 000ACE: | 30 | 53 | 1B | 30 | 55 | 22 | A2 | F3 | 92 | 1F | A2 | F4 | 92 | 1E | 82 | F3 |
| 000ADE: | 40 | 16 | A2 | F3 | 72 | F4 | 50 | 10 | A2 | 67 | 92 | 1D | 80 | 85 | 20 | F7 |
| 000AEE: | 07 | A2 | F4 | 40 | 06 | 53 | 30 | BF | 02 | 0A | 71 | A2 | F3 | 40 | F9 | 53 |
| 000AFE: | 30 | DF | 02 | 0A | 71 | | | | | | | | | | | |

I claim:

1. In an automotive vehicle of the type comprising at least one power lock motor, at least one power window motor, at least one power lock switch, at least one power window switch, and an ignition circuit, the improvement comprising:

a multiplex system comprising a central controller, at least one control bus coupled to the controller, means for applying multiplexed lock and window data signals to the at least one control bus indicative of the states of the power lock switch and the power window switch, respectively, means, coupled to the controller via the at least one control bus, for demultiplexing multiplexed lock and window control signals received from the controller via the control bus, and means for controlling activation of the power lock motor and the power window motor in response to the demultiplexed lock and control signals;

means for applying a multiplexed ignition signal to the at least one control bus, wherein the multiplexed ignition signal is in a first, on state when the ignition circuit is switched on, and a second, off state when the ignition circuit is switched off;

means for applying at least one multiplexed door status signal to the at least one control bus, wherein the multiplexed door status signal is in a first, closed state when a selected set of doors at the vehicle are all closed, and a second, open state when any of the doors in the selected set is open;

means, included in the controller, for setting the multiplexed lock control signal in accordance with the lock data signal;

means, included in the controller, for setting the multiplexed window control signal in accordance with the window data signal when the ignition signal is on and the door signal is closed;

means, included in the controller, for preventing the window data signal from altering the state of the multiplexed window control signal when the ignition signal is off and the door signal is open.

2. The invention of claim 1 wherein the preventing means includes means for setting the lock control signal in accordance with the window data signal when the ignition signal is off and the door signal is open.

3. In an automotive vehicle of the type comprising at least one manually operated control switch and at least one controlled element, a multiplex system comprising:

a programmable central controller;
at least one control bus coupled to the controller;
means for applying a multiplexed switch signal to the at least one control bus indicative of the state of the switch;

means for applying a multiplexed status signal to the at least one control bus, said multiplexed status signal having at least two states indicative of whether an operator has placed the vehicle in a first or second state;

first means, included in the controller, for generating a multiplexed control signal on the at least one control bus in accordance with the switch signal when the status signal indicates that the vehicle has been placed in the first state;

second means, included in the controller, for preventing the switch signal from altering the state of the multiplexed control signal when the status signal indicates that the vehicle has been placed in the second state;

means, coupled to the at least one control bus, for demultiplexing the multiplexed control signal to form a demultiplexed control signal; and means for controlling activation of the element in response to the demultiplexed control signal.

4. The invention of claim 3 wherein the vehicle comprises an ignition circuit and a set of doors, and wherein the status signal is in the first state when the ignition circuit has been switched on and is in the second state when the ignition circuit has been switched off and any door has been opened.

5. The invention of claim 3 wherein the controlled element comprises an electric motor.

6. The invention of claim 5 wherein the electric motor is a power lock motor.

7. The invention of claim 3 wherein the vehicle comprises an additional manually controlled switch, and wherein the status signal is indicative of the state of the additional switch.

8. The invention of claim 3 wherein the controller comprises a programmable microcomputer, and wherein the programmable microcomputer is included in the first and second means.

9. In an automotive vehicle of the type comprising at least one manually operated control switch and at least first and second controlled elements, a multiplex system comprising:

a programmable central controller;

at least one control bus coupled to the controller;

means for applying a multiplexed switch signal to the at least one control bus, said multiplexed switch signal indicative of the state of the switch;

means for applying a multiplexed status signal to the at least one control bus, said multiplexed status signal having at least two states indicative of whether an operator has placed the vehicle in a first or second state;

first means, included in the controller, for generating multiplexed control signals on the at least one control bus in accordance with the switch signal to control the first and second control elements in a first pattern when the status signal indicates that the vehicle has been placed in the first state;

second means, included in the controller, for generating multiplexed control signals on the at least one control bus in accordance with the switch signal to control both the first and second controlled elements in a second pattern, different from the first pattern, when the status signal indicates that the vehicle has been placed in the second state;

means, coupled to the at least one control bus, for demultiplexing the multiplexed control signals to form demultiplexed control signals; and means for controlling activation of the first and second elements in response to the demultiplexed control signals.

10. The invention of claim 9 wherein the vehicle comprises an additional manually controlled switch, and wherein the status signal is indicative of the state of the additional switch.

11. The invention of claim 10 wherein the switch and the additional switch are power window control switches and wherein the first and second controlled elements each comprise a respective power window motor.

12. The invention of claim 10 wherein the switch and the additional switch are power window control switches, and wherein the first and second controlled elements comprise a power window motor and a power lock motor, respectively.

13. The invention of claim 9 wherein the controller comprises a programmable microcomputer, and wherein the programmable microcomputer is included in the first and second means.

* * * * *